United States Patent
Robson et al.

(10) Patent No.: US 7,558,786 B2
(45) Date of Patent: Jul. 7, 2009

(54) METHOD FOR STORING TEXT ANNOTATIONS WITH ASSOCIATED TYPE INFORMATION IN A STRUCTURED DATA STORE

(75) Inventors: Christine Margaret Robson, Sunnyvale, CA (US); Yuji Watanabe, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 11/314,766

(22) Filed: Dec. 21, 2005

(65) Prior Publication Data
US 2006/0143164 A1    Jun. 29, 2006

(30) Foreign Application Priority Data
Dec. 24, 2004 (JP) .............................. 2004-373259

(51) Int. Cl.
G06F 17/00    (2006.01)
(52) U.S. Cl. ............................................. 707/3; 707/10
(58) Field of Classification Search ................ 707/1–10
See application file for complete search history.

(56) References Cited

U.S. PATENT DOCUMENTS

| | | | | | |
|---|---|---|---|---|---|
| 5,251,316 | A | * | 10/1993 | Anick et al. ................. | 707/101 |
| 5,301,315 | A | * | 4/1994 | Pellicano ....................... | 707/4 |
| 5,347,653 | A | * | 9/1994 | Flynn et al. .................. | 707/203 |
| 5,495,600 | A | * | 2/1996 | Terry et al. .................... | 707/3 |
| 6,006,232 | A | * | 12/1999 | Lyons .......................... | 707/101 |
| 6,049,804 | A | * | 4/2000 | Burgess et al. .............. | 707/100 |
| 2005/0044480 | A1 | * | 2/2005 | Dahan Templier ....... | 715/500.1 |
| 2006/0041570 | A1 | * | 2/2006 | Lowe et al. .................. | 707/101 |
| 2007/0174261 | A1 | * | 7/2007 | Kuboyama et al. ............. | 707/3 |

FOREIGN PATENT DOCUMENTS

JP        2001-312505    *    9/2001

OTHER PUBLICATIONS

National Institute of Standards and Technology, (Date: Aug. 27, 2004), Web publisher: National Institute of Standards and Technology.*
"Binary Search", National Institute of Standards and Technology, (Date: Aug. 27, 2004), Web publisher: National Institute of Standards and Technology.*

* cited by examiner

*Primary Examiner*—Mohammad Ali
*Assistant Examiner*—John P Hocker
(74) *Attorney, Agent, or Firm*—Richard M. Goldman; Shimokaji & Associates, P.C.

(57) ABSTRACT

A database system, a computer executable method, a computer executable program for the database system, and a method for updating an indexing tables in a database system are provided. The database system comprises a database storing item tables of items appended by timestamps. Each of the items is further categorized by timestamp into the tables, and the item tables are indexed by indexing data. The database system further comprises an indexing table for the indexing data, listing the earliest timestamp of the item table together with the indexing data and a system manager for searching the item tables using the indexing table and a maintenance module for the indexing table.

4 Claims, 5 Drawing Sheets

```
updateRCID(){
    when (P.update()) { //on updates to the products tables, [P]
        index idSi = P.getNewEntry().getComponentPartID(S);
        timestamp tSi = manufacturingTimeFast(idSi);
        index Pi = P.getCurrentTableID();
        if (new-version = true){
            RCID.insert(tSi, Pi);
        } else if (t-current < tSi) {
            // do nothing, optimism has succeeded
        } else if (RCID.lookupP(tSi) = Pi) {
            // do nothing, this out-of-order component part has already been
        predicted
        } else {
            index Pj = RCID.lookupP(tSi);
            timestamp end = predictRange(idSi);
            RCID.insert(tSi, Pj);
            RCID.insert(end, Pi);
        }}
```

Fig. 9

```
predictRange(index idSi){
    timestamp tSi = manufacturingTimeFast(idSi);
    index Pj = RCID.lookupP(tSi);
    timestamp end = timeWeightedBinarySearch(P.getTable(Pj), tSi);
    return end;}
```

Fig. 10

```
timeWeightedBinarySearch(Table timestampedTable,
                        // includes an index, timestamp, and value.
                        // Value is the index of the component part in S
                        Timestamp goal){ // previous manufacturing
time
    index first = timestampedTable.firstIndex();
    index last = timestampedTable.lastIndex();
    index middle = locateTimewiseMiddle(first,last,timstampedTable);
    loop while (|last - first|<= 1) {
        if (manufacturingTimeSlow(timestampedTable.value(middle)) < goal) {
            first = middle;
        } else {
            last = middle;}
        middle = locateTimewiseMiddle(first,last,timstampedTable);}
    return last;} locateTimewiseMiddle(index       first,      index     last,      table
timstampedTable){ //binary search
    time goal =
average(timestampedTable.time(first),timestampedTable.time(last));
    index middle = averageRoundUp(first,last);
        loop while (|last - first|<= 1) {
            if (timestampedTable.time(middle) < goal) {
                first = middle;
            } else {
                last = middle;}
            middle = averageRoundUp(first,last);}
        return last;}
}
```

Fig. 11

```
LookupProductFromComponentPart(index idSi){
    timestamp t = manufacturingTimeSlow(idSi);
    index idPj = RCID.lookupP(tSi);
    table Pj = P.getTable(Pj)
    index idMj = Pj.productMatchingPart(idSi);
    if (idMj == null){ //error in RCID table
        P.searchAllTables(idSi);
        RCID.fix(idSi); } }
```

Fig. 12

```
RCID.fix(index idSi){
    timestamp tSi = manufacturingTimeFast(idSi);
    index Pj = RCID.lookupP(tSi);
    timestamp end = predictRange(idSi);
    RCID.insert(tSi, Pj);
    RCID.insert(end, Pi);}
```

METHOD FOR STORING TEXT ANNOTATIONS WITH ASSOCIATED TYPE INFORMATION IN A STRUCTURED DATA STORE

BACKGROUND

1. Field of the Invention

The present invention relates to a technique for updating entries of database, and particularly relates to the database system, a method and a program for creating a time-based reverse look-up table which effectively accelerates retrievals of entries of the database.

2. Background Art

Optimizing database searches has been the subject of much research. Indeed, every major database maker has devoted much time and energy to such optimizations. Searching individual databases has become a specific of implementation, since optimizations are so highly keyed to specific database structures.

The database and data stored in the database become more and more huge and the database systems are more and more utilized by a distributed computing environment. In such a circumstance, users of the database system have to pay attention to the time dependent correlation of the databases and then it is requested to enhance the search efficiency of database in which entries are updated or evolved with respect to time elapse.

Japanese Patent Laid-Open No. 2001-312505A by, Kobayashi et. al. and assigned to the same assignee of the present invention discloses the search/retrieval system of items in the database in which the items are evolved with respect to time. In the disclosed system, the items are stored as a binary data including timestamps and then a time window is added in the search query to retrieve the time weighted items. However, the disclosed method does not use any indexing data structure prepared separately with the items searched. Japanese Patent Laid-Open No. 2001-312505A

SUMMARY OF THE INVENTION

The target of the inventors is the manufacturing industry and particularly, the invention concerns tracing products as they are incorporated in more complex data structure. The inventors address the problem of reverse traceability over multiple-layers of databases which may change their schemas or relationships at any time. The present invention provides a means for quickly identifying the final product built using a specific component part, even when data-update cycle is uncertain.

This patent hence concerns searching for information in a large, distributed database setting. As such, this technology is designed for efficient indexing, using cached data. The approach of the present invention differs from previous approaches in that we make use of time windows for mapping. The present invention provides a means for component-parts traceability in a changing supply chain, i.e., data-update cycle. It is possible to quickly match products and component parts, without knowing the details of the supply chain at the manufacturing time. The present solution incorporates an efficient reverse lookup table tailored to the problem of component-parts traceability in a changing supply chain, i.e., up-date cycles of the database.

As shown hereinafter in this disclosure, the maintenance cost of these tables is tiny if parts are mostly delivered and used in order, and approaches a logarithmic execution time for error correction when there are frequent shipping or production delays and badly-ordered parts. This execution time is achieved using a Time-Weighted Binary Search Algorithm, as described in this patent.

We provide a means for component-parts traceability in a changing supply chain. It is possible to quickly match products and component parts, without knowing the details of the supply chain at the manufacturing time. Our solution incorporates an efficient reverse lookup table tailored to the problem of component-parts traceability in a changing supply chain.

According to the present invention, the maintenance cost of these tables is tiny if parts are mostly delivered and used in order, and approaches a logarithmic execution time for error correction when there are frequent shipping or production delays and badly-ordered parts. This execution time is achieved using a Time-Weighted Binary Search Algorithm, as described in the present invention.

DETAILED DESCRIPTION OF THE INVENTION

Hereinafter, the present invention will be disclosed by using a specific embodiment in which the maker-supplier parts distribution database is subjected to the present reverse-tracing database references along an uncertain path. Specifically, we attempt to identify a product, by knowing one of its component parts, in a changing supply chain.

A. System Construction

Figure 1:
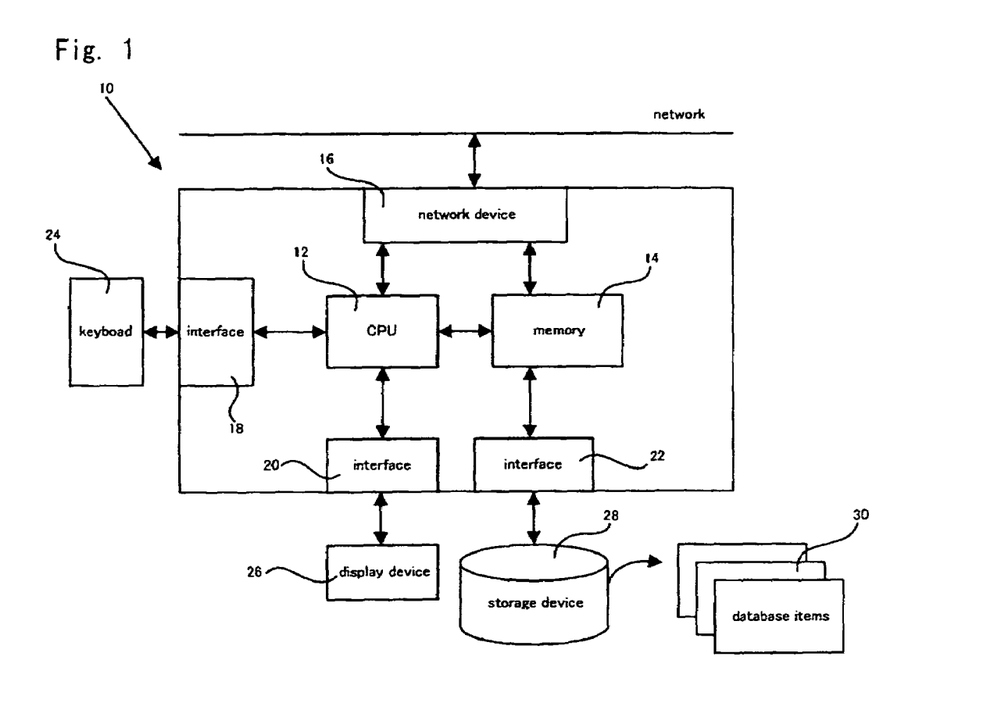
FIG. 1 shows general system architecture used in the present invention.

FIG. 1 shows a general system architecture used in the present invention. The system 10 comprises generally a CPU 12 for executing the method for creating reverse look-up table and a memory 14 which makes possible the processing of CPU 12 and stores execution programs and data. The system 10 further comprises a network device 16 and appropriate interfaces 18-22 such as ATA, IDE, or RS-232C etc. and each of which is interconnected to an input device 24 such as keyboard, to a display device 26, and to a storage device 28. In the storage device 28, the database 30, are stored and periodically or upon user-needs, entries of the database are updated.

The system 10 may be a microcomputer or a workstation operated by an operating system such as Windows (trademark), or MacOS (trademark) under PENTIUM (trademark) type processor. Alternatively, the system 10 may have the architecture of UNIX or LINUX which are processed by a RISC architecture microprocessor under the AIX (trademark) architecture. The database 30 shown in FIG. 1 may be adopted from any databases including any relational database which may be accessed by SQL language.

Figure 2:
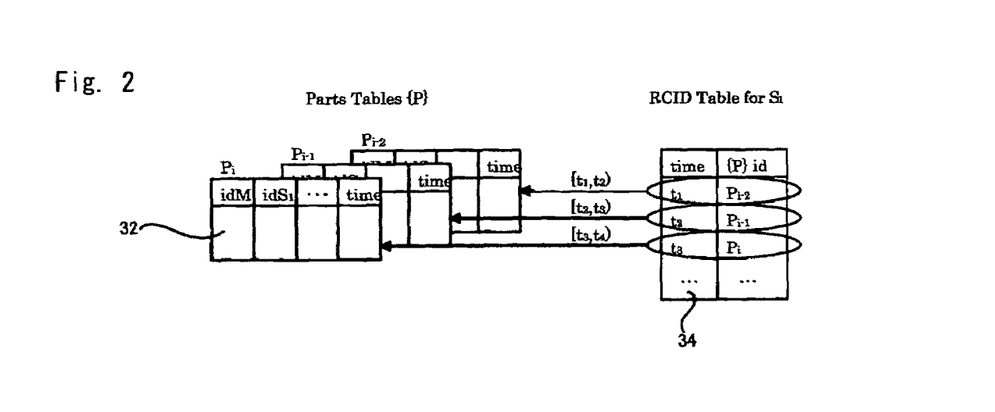
FIG. 2 shows a data construction of the database 30.

FIG. 2 shows a data construction of the database 30. The database 30 generally contains two sets of data which are referred as parts-table 32 and RCID-tables for a specific item such as S1. The parts-tables are created along with time such as t1, t2, t3, . . . and the creation of the parts-table may be executed periodically or every time when users need such update of the database entries. In addition, the database 30 contains other table referred by RCID-table 34 in which the update-time tn and parts-table id ({P}id) are paired therein. Because the update-time of the parts-table is unpredictable, the users of the parts-table searches his or hers desired parts-table by querying the timestamp appended thereto; however, the user can not find the parts-table directly among many time-evolved parts-table when the user does not know the exact timestamp. Therefore, it is quite useful to create the Reverse Component InDex (RCID) table as shown in FIG. 2.

The another embodiment of the present invention, the parts-table 32 and the RCID-table 34 are stored in different hard-disk drive placed remote sites such as a warehouse section and a factory section and the coincidence of the parts-list and the RCID table may be attained through network.

Figure 3:
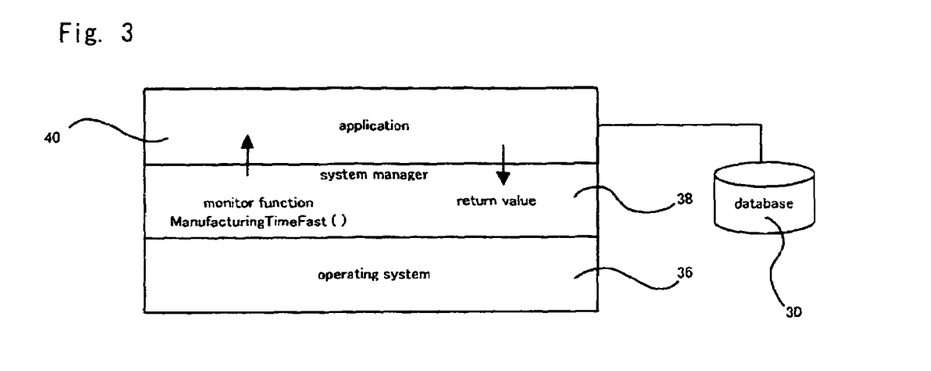
FIG. 3 shows a software construction of the present system 10.

FIG. 3 shows a software construction of the present system 10, and the system 10 is generally constructed as 3 (three) layered software architecture. The operating system 36 layer is the lowest, i.e., basic software. The system manager 38 layer stands on the operating system 36 and executes the management of the RCID table upon request from the application 40. The application 40 provides interfaces between the database 30 and the user and makes it possible to access to the entries of the database 30 through an input-output operation or a search operation.

The system manager 38 is implemented with a monitor function which issues query of the most recent timestamp appended to the particular parts-table and receives the corresponding timestamp as the return value, which referred by the instruction hereafter as manufacturingTimeFast(idSi). The system manager 38 is also implemented with functions referred as Compare ( ), Find ( ), and Insert ( ). The function Compare ( ) compares the returned value with the timestamp of the same {P} id stored in the RCID table to re-order or to provide maintenance of the RCID table. The function Find ( ) compares the returned value with the sequence of the timestamps between which the parts-table is inserted. The function Insert ( ) inserts the parts-table {P} id between the records having the timestamps which are found by the Find ( ).

In order to further explain the present invention, here some additional assumptions are provided as follows:

(1) Consider a database of products, M, and a supplier database, S. The System Manager, G, of M, may not have any control over S, or the supply chain from S to M. The system manager maintains a parts list for every product listed in M, in a product table. Because there are many products, we assume the product table is broken down into several smaller tables, based on manufacturing time. For example, a new product table might be started every month. These smaller tables are indexed in some fashion, and constitute a set of product tables, {P}.

(2) It is further assumed, in this system, queries to G which require information contained in M. The subject of the invention is efficiently finding any element of S in {P}, and therefore in M. The following features are herein assumed based directly on observations of supply chains:

(a) M, {P} and S are append-only (b) Given an index in S, we identify S. That is, we can tell the manufacturer of any part, from the part ID.

(c) every entry in M, and S is timestamped (d) Component parts which are manufactured at the same time are generally used for construction at the same time. We generalize this property as: Consider an element in Si with index idSij and timestamp tSij, which is referenced by idMj, at timestamp tMj. It is likely that a nearby element of Si, idSik, with timestamp tSik, such that tSij-tSik is small, will be referenced by a nearby element of A, idMk, with timestamp tMk, such that tMj-tMk is small.

(e) Component parts are generally used in the order they arrive, and shipments are rarely delayed for a long time. Thus, it is unlikely that an older component part is used to build a newer product, once newer component parts have begun to be used.

This property may be generalized as: two elements in Si, with indices idSij and idSik, and timestamps tSij and tSik, respectively, such that tSij >>tSik. If these elements are referenced by idMj, at timestamp tMj and idMk at timestamp tMk, respectively, It is unlikely that tMj <<tMk.

The basic method is to index time windows of parts manufacture in a Reverse Component InDex table, RCID. This table will match manufacturing times of component parts, to tables in {P} which likely contain that part. As per assumption (d), our goal here is to avoid implementing a complete reverse-lookup table, but to narrow the search space for reverse lookups. The RCID table is maintained by the System Manager, G, and provides a fast way to retrieve information from the component part's databases without searching them, or accessing intermediate databases.

The RCID table for S maps time windows, represented by start times, t, to a specific table in {P}, indexed by some identification number, pi. The start time is a timestamp, tSj, from S, corresponding to an entry with index idSj. idSj in this case is the first index in S referenced by an element of M listed in the parts table with index pi, in a continuous batch of references. That is, it represents the manufacturing time of the first component part that was used to make a product M since table Pi was started.

B. RCID Maintanance

The following algorithm employs an optimistic strategy. Here the assumption is provided that most component parts are delivered in order, and do not edit the RCID table if everything goes smoothly. This algorithm only updates the RCID when a new parts table has been issued, or if there is a major shipping delay, and a new parts table has been issued in the interim. Here, in the explained embodiment, the following assumptions are made:

(f) There exists an efficient means of looking up the manufacturing time of component parts which are still on the factory floor. That is, for every component part in the manufacturing center, there exists some record of its manufacturing time in an easy to access manner. Here, the above matter may be formalized with a function of manufacturingTimeFast(idSi), which returns the manufacturing time of the part Si with ID number idSi. The above assumption (f) may be justified on the following grounds: It is realistic to require suppliers to provide manufacturing information on their products It is inexpensive to maintain such information for the short period of time that the component part is waiting to be used. A related query may already be preformed by the manufacturer in building {P}

Figure 4:
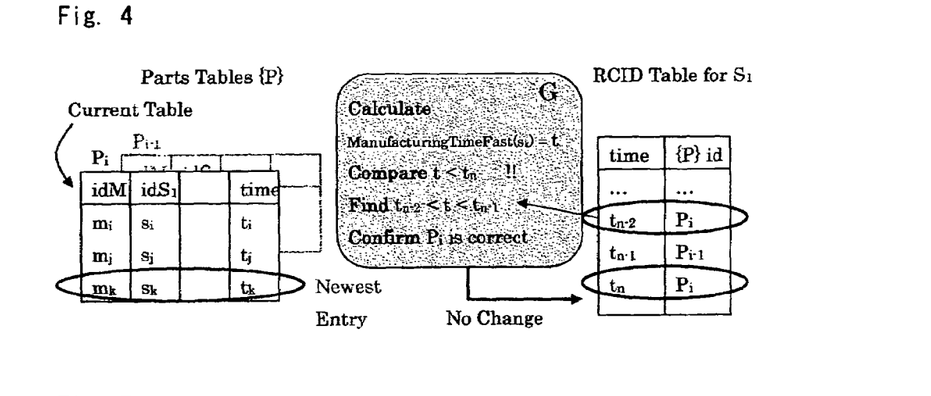
FIG. 4 shows the basic monitor procedure in the present invention.
Figure 5:
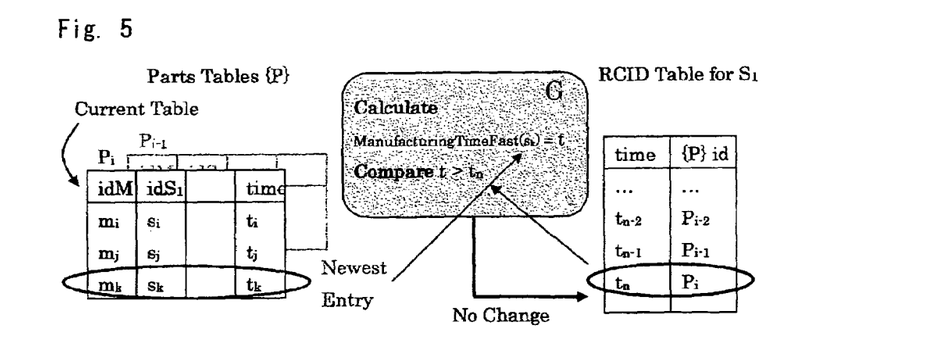
FIG. 5 shows the basic monitor procedure in the present invention.
Figure 6:
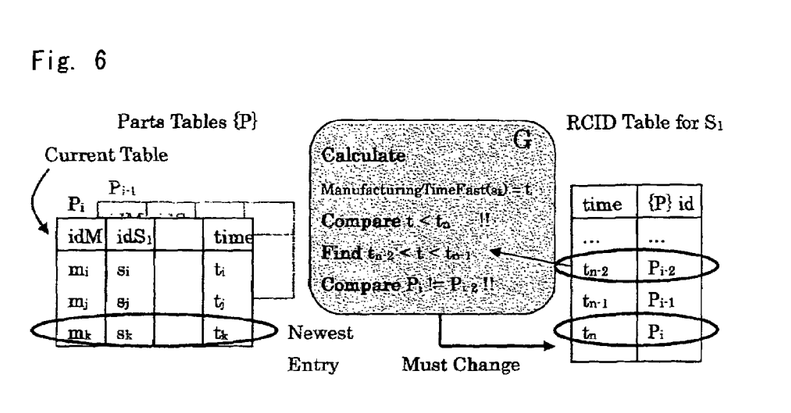
FIG. 6 shows the basic monitor procedure in the present invention.

FIGS. 4-6 shows the basic monitor procedure by the functions Compare ( ), Find ( ), Insert ( ). In FIG. 4, the parts-table {P} is queried by manufacturingTimeFast(idSi) and the manufacturingTimeFast(idSi) returns its return value t to the system manager. Then the function call Compare ( ) is made with its variables (t, tn). Here, t is the newest timestamp of parts-table {P}id and tn is the timestamp of the same {P}id in the RCID table. In the case shown in FIG. 4, the function Compare returns positive return value, because the result is t>tn and there is no irregular order in the RCID table.

FIG. 5 shows another embodiment of the monitor procedure in which the parts-table appended with the id of {P}id with the timestamp tn−2. The return value of manufacturingTimeFast(idSi)=tk, and the returned value tk lies between tn−2 and tn−1. Thus the timestamp sequence of the RCID is correct so that any maintenance procedure is not required.

FIG. 6 shows the embodiment of the monitor procedure in which the RCID table has to be repaired. In FIG. 6, the return value tk lies between tn−2 and tn−1; however, the appended {P}id is different. Then, the RCID table has to be repaired to include the correct sequence. This repair procedure is executed by the function call of Insert [ ] as explained in FIG. 7.

Figure 7:
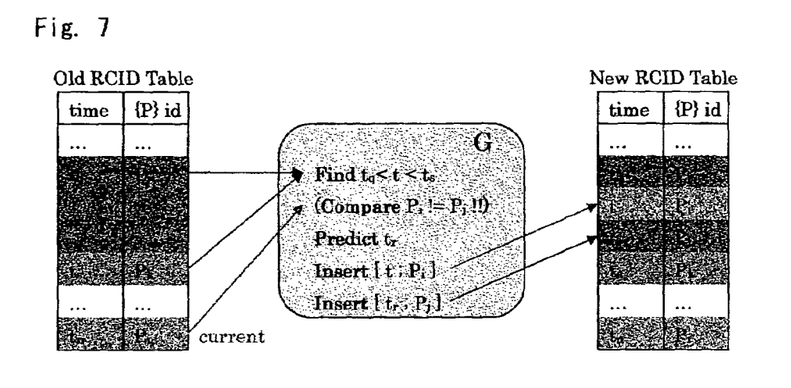
FIG. 7 shows the function of repair process of the RCID table.

FIG. 7 shows the function of repair process of the RCID table. Prior to calling the function Insert [ ], the system manager calls the function Compare ( ) to determine the records between which the parts-table or parts-tables are inserted are determined. Then the system manager calls the function Predict tr to determine the insert sequence of the corresponding parts-table id {P} id and then the system manager calls the function Insert [ ] with the variables (t; Pi) to insert the correct records to the RCID table.

Figure 8:
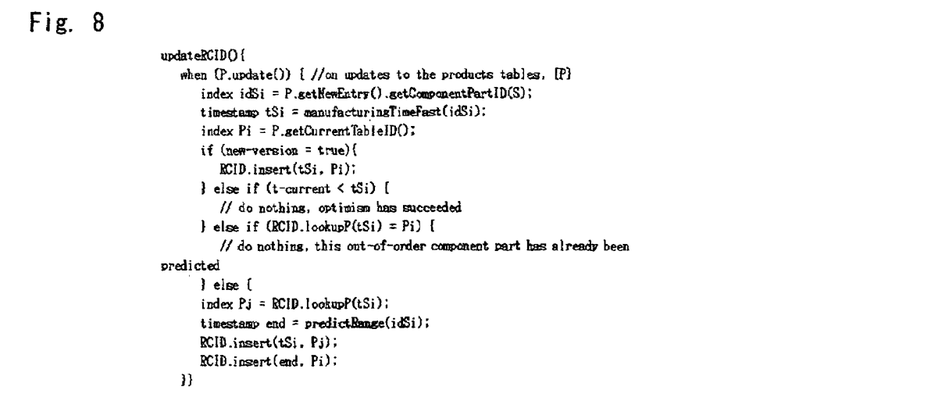
FIG. 8 shows the pseudocode of the algorithm explicitly laid out in the present invention.
Figure 9:
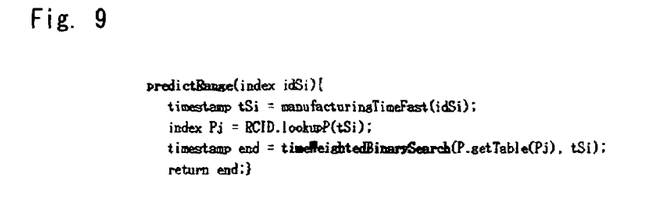
FIG. 9 shows the pseudocode of the predictRange.

The algorithm is explicitly laid out in the pseudocode shown in FIG. 8. In FIG. 8, the undefined function predictRange appears, and the function predictRange is for the purpose to identify the manufacturing time of the last component part should be listed in Pj. Since elements are not ordered by component manufacturing time, the binary search, weighted by order of the manufacture of the finished product is allowed. In FIG. 9, the pseudocode of the predictRange is summarized.

C. Time Weighted Binary Search

The system manager, G, can call on the function manufacturingTimeSlow(idSi). This function operates the same as manufacturingTimeFast(idSi), returning the manufacturing time of a component part, Si, with index idSi. However, Si need not have been recently used; this function is used to find old batches of parts which were incorrectly mapped in the RCID. Typically this function would be implemented as a lookup in database. This function is slow in the sense that S is likely remote, and queries are expensive.

The essential method is to do a binary search to find the time of the next reference after time previous. In order to let this binary search do as few calls to manufacturingTimeSlow ( ) as possible, here, elements are selected to search by manufacturing time, not by order in the table. This amounts to a binary search, over all idMi in Pi, using those idMi to find the idSi to lookup in S. The unique aspect here is that we choose the idMi based on timestamps, with differences in real time, not on record numbers.

Figure 10:
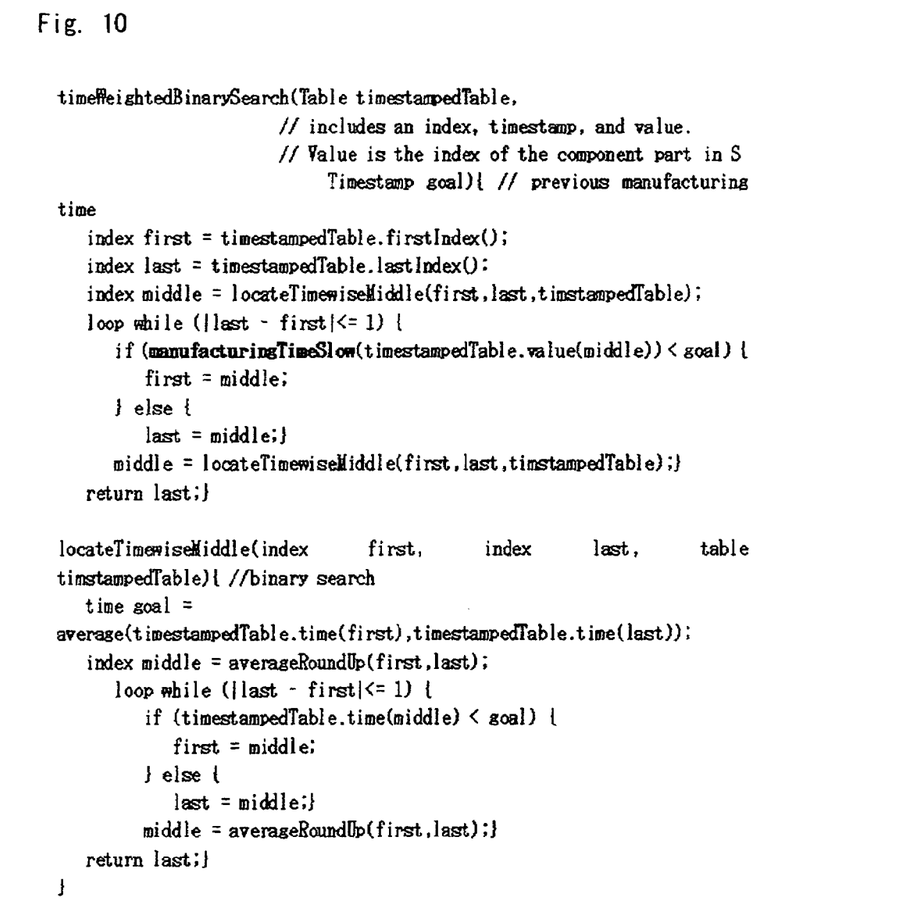
FIG. 10 shows the pseudocode for the binary search algorithm.

The pseudocode for the binary search algorithm is shown in FIG. 10. These functions allow predictRange to return the next index. The overhead for the computation is correctly mapped with only O(log(n)) calls to manufacturingTimeSlow ( ) and hence the time weighted binary search does not exert heavy overhead to the system manager.

D. Brief Analysis of Update Algorithms of the present invention For each new product manufactured (ie each update to {P}): If the component part was used mostly in the order of it's manufacturing: Read cost to S is zero: Write cost to RCID is zero: Computation cost is O(1): Memory used is zero: If the component part was delayed, but it's delay has been predicted: Read cost to S is zero: Read cost to RCID is O(|RCID|) approx O(|{P}|+|number of lost shipments|): Write cost to the RCID is O(1): Computation cost is O(|RCID|): Memory used is zero: If the component part was delayed, but it's delay has been predicted: Read cost to S (ie number of calls to manufacturingTimeSlow) is O(log(|Pi|)): Read cost to {P} is O(log(|Pi|)$^2$): Write cost to RCID is O(|RCID|): Communication cost to each Si in {S} is O(log (n)): Computation cost is O(|RCID|+log(|Pi|)$^2$): Memory used is O(1)

Thus, this update algorithm operates quickly and economically unless there is a major shipping delay. In addition, if there is such a delay, expensive calls to the supplier's database are only preformed once, and these calls are limited logarithmically.

E. Product Lookups Using The RCID

Figure 11:
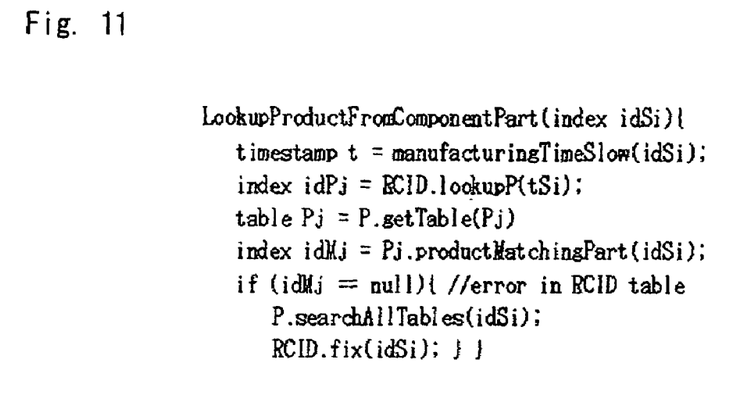
FIG. 11 shows the pseudocode which demonstrates the algorithm for performing lookups using the RCID table.

In the present invention, the part-table is looked-up using the RCID to enhance the search of the parts-table. The pseudocode shown in FIG. 11 demonstrates the algorithm for performing lookups using the RCID table. As shown in FIG. 11, the lookup procedure is executed by simple codes and then it is understood that the lookup procedure, i.e., the search of the parts-table is completed fast and depends almost entirely on the data stored in the parts-table.

Errors in the RCID table should be few, since the Time Weighted Binary Search is efficient when parts are used mostly in the order they are made. Thus, total communication to database S (i.e., calls to manufacturingTimeSlow) is O(1). Total computation time is O(|Pj|+|RCID|). The processing time without the RCID tables would be O(|P1|*|P2|* . . . *|Pj|* . . . ), for every table in {P}. Thus this algorithm is a drastic improvement in computation cost.

Figure 12:
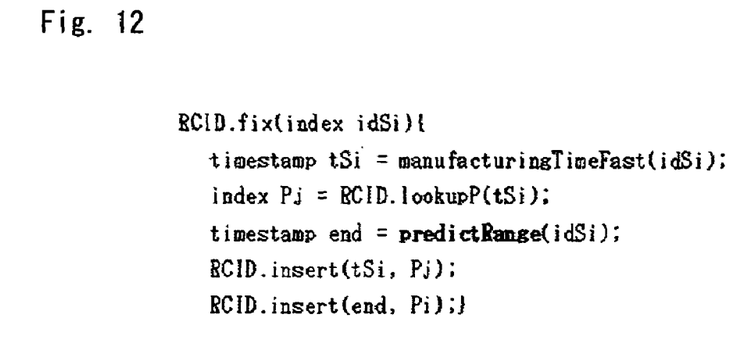
FIG. 12 shows the pseudocode for the embodiment of runtime correction.

In addition, the present invention, the system manager may perform runtime correction of the RCID during lookup of parts using the RCID table. If a mistake is discovered, the embodiment for such runtime correction is shown in FIG. 12. As shown in FIG. 12, the system manager may correct the RCID using shared functions used in the maintenance procedure and then the entire software code may be quite compact. Particularly, the code is very similar to the code used for badly out of order parts at production time. In particular, this code relies on the same predictRange function. Thus, the correction algorithm has equivalent costs and runtimes to those of the RCID update algorithm.

The program of the present invention is described by any of well known programming languages such as, for example, C, C++, and Java (trademark) and distributed by recording any computer readable media such as a flexible disk, a CD-ROM, a DVD, Magneto-Optical disk or by transmitting through a network.

F. Application Fields

The present invention has wide application range in order to provide an efficient solution to the problem of reverse item lookups. It can be implemented for any parts supplier, with few requirements, and operates entirely autonomously. Thus, this technology enables a complete component part tracking system for all component parts used by the manufacturer, over the entire history of production. In addition, the use of time windows to narrow search spaces together with the RCID makes this technology applicable for any situation where databases are timestamped. Thus, this system could be used for searching in the technology area including; Historical Records, Security Logs, Lending Libraries and the like.

INDUSTRIAL APPLICABILITY

The RCID makes it possible to efficiently locate any information about a product, given one of its items. Thus this technology can provide vast assistance to manufacturers during parts recalls. Typically, tracing an entire batch of component parts is cumbersome and time consuming. However, with this newly improved search method, it is possible to quickly locate all shipped products containing the defective parts. This will reduce expense for manufacturers, and hasten the notification process to customers who may be in danger from the use of faulty parts.

We claim:

1. A database search method in a database system, said database system comprising a computer including a CPU, a memory, and a storage device, said database being stored in said storage device, said database search method making said computer execute the steps of:

storing parts tables of items appended by timestamps in a database, including parts table identifiers, and storing items in an indexing table in which the update time and parts table identifier are stored, said parts tables being indexed by indexing data, said database and said parts tables being updatable by appending only, categorizing said items by timestamp and parts table identifier into said parts tables, and indexing said parts tables by indexing data such that time differential between given items is correlated to time differential between indexing data corresponding to said given items, appending said database with items from a second database when a predetermined number of new items becomes available in said second database, storing an indexing table for said indexing data, listing a newest timestamp of said parts tables together with said indexing data, searching for a target item from said indexing table among said items from said parts tables, repairing said indexing table with respect to time evolution by a maintenance module, said maintenance module executing further steps of:

updating, in response to an event, said indexing table by appending said indexing table with items from said parts tables, and said updating occurs when a new one of said parts tables is issued, monitoring correlation between said parts tables and said indexing table by comparing a timestamp of an item with a newest timestamp in said parts tables with a timestamp of an entry in said indexing table, said entry in said indexing table corresponding to said item with said newest timestamp in said parts tables, and examining said correlation of said indexing table using said newest timestamp and said indexing data as examination keys, repairing said indexing table by predicting an insert sequence of entries in said indexing table if a value of said newest timestamp of said parts table identifier is less than a value of said timestamp corresponding to the parts table identifier of said entry in said indexing table for said item having said newest timestamp, returning a positive value, indicating said indexing table is in regular order if said value of said newest timestamp of said parts table identifier is greater than a value of said timestamp corresponding to the parts table identifier of said entry in said indexing table for said item having said newest timestamp, indicating that said indexing table is in regular order if said value of said newest timestamp of said parts table identifier is between two values of timestamps corresponding to the parts table identifier of said indexing table, repairing said indexing table by predicting the insert sequence of entries in the indexing table and inserting the insert sequence corresponding to the parts table identifier, if said value of said newest timestamp of said parts table identifier is between two values of timestamps of said indexing table, with the two values of timestamps of said indexing table corresponding to different parts table identifiers, executing a binary search of said database with referring said indexing table, determining whether or not an appending of records of said indexing table is required depending on search keys, and depending on said determination step, if said appending is required, calling a repairing function so as to append said update records while executing said binary search.

2. The database search method of claim 1, said method further making said computer execute the step of appending records to said indexing table in response to results of said examination of said monitor tool according to said timestamp and said indexing data.

3. The database search method of claim 1, said method further including the step of executing a binary search as part of said repaired indexing table.

4. A method for updating an indexing tables in a database system, said database system comprising a computer including a CPU, a memory, and a storage device, said database being stored in said storage device, said method making said computer execute the steps of:

storing parts tables of items appended by timestamps in a database, categorizing said items by timestamp and parts table identifier into said parts tables, and indexing said parts tables by indexing data such that time differential between given items is correlated to time differential between indexing data corresponding to said given items, appending said database with items from a second database when a predetermined number of new items becomes available in said second database, listing a newest timestamp of said parts tables together with said indexing data, monitoring a correlation between said parts tables and said indexing table, wherein said correlation is responsive to a difference between timestamp value of an entry in said parts tables and timestamp value of an entry in said indexing table for a given parts table identifier, invoking from said parts tables said newest timestamp together with said indexing data, examining said correlation of said indexing table using said invoked newest timestamp and said indexing data as examination keys, appending update records to said indexing table in response to results of said examination of said monitor tool according to said timestamp and said indexing data by determining record sequence and appending said update records in accordance with record sequence, updating said indexing table by predicting an insert sequence of entries in said indexing table if a value of said newest timestamp of said parts table identifier is less than a value of said timestamp corresponding to the parts table identifier of said entry in said indexing table for said item having said newest timestamp, and returning a positive value, indicating said indexing table is in regular order if said value of said newest timestamp of said parts table identifier is greater than a value of said timestamp corresponding to the parts table identifier of said entry in said indexing table for said item having said newest timestamp, indicating that said indexing table is in regular order if said value of said newest timestamp of said parts table identifier is between two values of timestamps corresponding to the parts table identifier of said indexing table, updating said indexing table by predicting the insert sequence of entries in the indexing table and inserting the insert sequence corresponding to the parts table identifier, if said value of said newest timestamp of said parts table identifier is between two values of timestamps of said indexing table, with the two values of timestamps of said indexing table corresponding to different parts table identifiers, wherein said updating an indexing table is executed when a new one of said parts tables is issued, executing a binary search of said database with referring said indexing table, determining whether or not an appending of records of said indexing table is required depending on search keys, and depending on said determination step, if said appending is required, calling a repairing function so as to append said update records while executing said binary search.

* * * * *